(12) United States Patent
Dahl et al.

(10) Patent No.: US 9,995,271 B2
(45) Date of Patent: Jun. 12, 2018

(54) WIND TURBINE BLADE WITH TAPERING ROOT BUSHINGS

(75) Inventors: Martin Dahl, Flensburg (DE); Bjarne Krab Mortensen, Billund (DK); Benjamin Hornblow, Copenhagen Ø (DK)

(73) Assignee: LM WP PATENT HOLDING A/S, Kolding (DK)

( * ) Notice: Subject to any disclaimer, the term of this patent is extended or adjusted under 35 U.S.C. 154(b) by 787 days.

(21) Appl. No.: 14/111,027

(22) PCT Filed: Apr. 11, 2012

(86) PCT No.: PCT/EP2012/056552
§ 371 (c)(1),
(2), (4) Date: Oct. 10, 2013

(87) PCT Pub. No.: WO2012/140062
PCT Pub. Date: Oct. 18, 2012

(65) Prior Publication Data
US 2014/0030096 A1 Jan. 30, 2014

(30) Foreign Application Priority Data
Apr. 11, 2011 (EP) .................................... 11161906

(51) Int. Cl.
*F03D 1/06* (2006.01)
*B29C 70/86* (2006.01)

(52) U.S. Cl.
CPC ............ *F03D 1/0658* (2013.01); *B29C 70/86* (2013.01); *F03D 1/0675* (2013.01); *Y02E 10/721* (2013.01)

(58) Field of Classification Search
CPC .... F03D 1/0658; F03D 1/0666; F03D 1/0675; F03D 1/0683; B29C 70/86; B23D 15/002; B23D 15/02; B23D 15/04; B23K 3/04
See application file for complete search history.

(56) References Cited

U.S. PATENT DOCUMENTS 7,163,378 B2 * 1/2007 Kildegaard ........... B29C 70/525
416/230
2008/0160248 A1 * 7/2008 Jacobsen ............. B29C 37/0082
428/113

(Continued)

FOREIGN PATENT DOCUMENTS

EP   2 138 716 A1   12/2009
GB   2 191 249 A    12/1987

(Continued)

*Primary Examiner* — Igor Kershteyn
*Assistant Examiner* — Brian P Wolcott
(74) *Attorney, Agent, or Firm* — Nath, Goldberg & Meyer; Jerald L. Meyer; Tanya E. Harkins (57) ABSTRACT

A wind turbine blade for a wind turbine is a shell structure of a fiber-reinforced composite and comprises a root region and an airfoil region. The root region has a ring-shaped cross section and comprises a plurality of elongated bushings 7 with an inner thread 22 and which are embedded interspaced in the fiber-reinforced polymer so as to substantially follow the circumference of the root region and allow access from the outside to the inner threads 22. The bushings 7 are formed conically tapering from a second end towards a first end thereof, the first end of the bushing 7 being arranged at the end face of the root region.

23 Claims, 8 Drawing Sheets

(56) References Cited

U.S. PATENT DOCUMENTS

2008/0206059 A1* 8/2008 Hancock ............... F03D 1/0658
  416/213 R
2009/0324420 A1* 12/2009 Arocena De La Rua
  ........................... B29C 70/865
  416/248

FOREIGN PATENT DOCUMENTS

| WO | 03/057457 A1 | 7/2003 |
| WO | 2010/018225 A2 | 2/2010 |

\* cited by examiner

FIG. 1

PRIOR ART

WIND TURBINE BLADE WITH TAPERING ROOT BUSHINGS

This is a National Phase Application filed under 35 U.S.C. 371 as a national stage of PCT/EP2012/056552, filed 11 Apr. 2012, claiming priority from European Application No. 11161906.0, filed Apr. 11, 2011, the content of each of which is hereby incorporated by reference in its entirety.

TECHNICAL FIELD

The present invention relates to a wind turbine blade for a wind turbine rotor comprising a hub from which the wind turbine blade extends when mounted to the hub, the wind turbine blade including a shell structure of a fibre-reinforced composite material comprising fibres embedded in a polymer matrix, the wind turbine blade extending in longitudinal direction and having a profiled contour including a pressure side and a suction side as well as a leading edge and a trailing edge, said edges defining a chord plane therebetween, when seen in the longitudinal direction the profiled contour comprising a root region with a root end face, an airfoil region and optionally a transition region between the root region and the airfoil region, the root region having a ring-shaped cross section with an outer surface and an inner surface, the root region comprising a plurality of elongated fastening members provided with fastening means and embedded mutually spaced apart in the fibre-reinforced polymer so as to substantially follow a circumference of the root region and allow access from the outside to the fastening means used for mounting the blade to the hub, the fastening members comprising a first end arranged at the root end face, a second end opposite the first end thereof and an outer periphery comprising an outer surface, an inner surface, a first lateral face and an opposite second lateral face.

BACKGROUND ART

Wind turbine blades and thereby also the root region thereof are often made by assembling two blade halves essentially corresponding to the suction side and the pressure side, respectively, along the chord plane. However, the blades may also be moulded in their entirety by so-called hollow moulding.

The root region comprises layers of fibres forming an outer layer and an inner layer between which fastening members in the form of bushings are placed. A separately formed inserts may be placed between each pair of adjacent bushings, whereby the bushings are mutually separated by the inserts. The known inserts are made of glass fibres embedded in a suitable resin.

A potential problem in connection with wind turbine blades is load transfer from the fibre composite structure of the root region to the hub of the wind turbine. The connection and transfer of loads from the blade to the hub is inter alia provided by mounting the blade to the hub by screwing bolts into the bushings placed in the root or by means of nuts screwed onto stud bolts screwed into the bushings. In case the number of bolts and thereby the number of bushings has to be increased to handle a given load, remaining area of the fibre composite material between the bushings is reduced. This may result in the root connection being insufficiently supported to withstand the loads, whereby the connection between the blade root and the hub may fail since the bushings are insufficiently retained in the composite material and thus pulled out of the composite material of the root region. This is especially a problem when long and thereby heavy blades are to be used.

WO 2010/018225 provides a method of manufacturing a wind turbine blade comprising a steel wire or steel fibre-reinforced polymer matrix. However, the document does not address the problem of how the root region is to be designed to withstand extreme loads in the connection between the blade root and the hub.

EP 2 138 716 describes a blade insert provided in the lamination of a wind turbine blade. The insert is made up of two part, namemly a head and a body. The head is designed so as to be able to screw the insert onto another structure. The body has a cylindrical exterior and has a conical cavity. Thereby, the body provides a smooth transition to the blade laminate.

WO 03/057457 discloses a wind turbine blade comprising root end bushings with wedges provided in extension of the bushings.

GB 2 191 249 discloses a blade for a RAM air turbine machine. The blade is a composite structure integrally formed with a socket of metallic material.

DISCLOSURE OF THE INVENTION

It is an object of the invention to provide a wind turbine blade with a root region overcoming at least one of the drawbacks of the prior art or at least provides a useful alternative.

According to a first aspect of the invention, the root region of a wind turbine blade of the type described is provided with at least a number of elongated fastening members being formed with a longitudinal section where the outer periphery is tapering in a direction from the second end towards the first end of the fastening members over at least 10% of a longitudinal extent of the fastening members.

The outer periphery of the fastening member may provide the longitudinally tapering section. In other words a section of the outer periphery forms the longitudinally tapering section of the fastening members. In situations where the fastening member has a partially corrugated surface, the tapering may be formed by an envelope to outer periphery, i.e. a line that follows the peaks of the corrugated surface.

During use of the wind turbine, the fastening members embedded in the polymer matrix are subjected to a force which tends to pull the fastening members out of the root region. However, as the fastening members are formed so as to be tapering or have an envelope to the outer periphery provided with a longitudinally tapering section tapering in the direction from the second end towards the first end, the shape thereof tends to prevent the fastening members from being pulled out when subjected to above force. In other words, the longitudinally tapering section tends to retain the fastening members in the root region.

It is clear from the following that it is the outer periphery, or in other words an exterior of the fastening member, preferably being a bushing, that is tapered towards the root end of the blade. Thus, the terms "outer surface", "radially outer surface", "inner surface", and "radially inner surface" only define the exterior sides facing towards the outer surface and the inner surface of the shell structure, respectively. Thus, it is the exterior tapering of the fastening member or bushing that increases the pull-out strength.

According to an embodiment of the invention adjacent fastening members may be arranged so that longitudinally tapering sections of adjacent fastening members face each other.

The tapering sections may be linearly tapering. It should, however, be noted that the tapering section may taper in any way, e.g. stepwise.

According to another embodiment the longitudinally tapering section of the fastening member may extend over the entire circumference of the fastening member within the longitudinal extent of the longitudinally tapering section.

Hereby, the longitudinally tapering section may have a conical shape in case the cross section thereof is circular.

According to a further embodiment of the invention the longitudinally tapering section may extend over at least 20, 30, 40, 50, 60, 70, 80, 90, 100% of the longitudinal extent of the fastening member.

An optimum retention of the fastening members is obtained when the tapering section extends over the entire extent of the fastening members and when the tapering section extends over the entire circumference of the fastening members.

Additionally, the outer surface of the longitudinally tapering section may be substantially smooth. However, it should be noted that the outer surface of the longitudinally tapering section also may be corrugated or having another surface structure which tends to improve the retention of the fastening members in the fibre-reinforced composite material of the root region.

According to a further embodiment of the invention any cross section of the elongated fastening members may be essentially circular perpendicular to a longitudinal axis thereof.

As a result, the manufacture of the fastening members is relatively simple due to the overall circular shape of the fastening members.

Additionally, the tapering section of the fastening members may comprise oppositely arranged planar surfaces converging against each other.

According to yet another embodiment, the fastening members may be bushings and the fastening means may be a thread in a bore in the bushing.

Optionally, the fastening members may be rods and the fastening means may be an outer thread thereof.

In an advantageous embodiment the root region further may comprise separate pre-made made inserts formed of a fibre-reinforced polymer and arranged in regions between adjacent lateral faces of the fastening member, preferably in each region between adjacent lateral faces of the fastening members, said inserts comprising a first insert part substantially corresponding to the region between the lateral faces of the adjacent fastening members.

According to a further embodiment opposite lateral faces of the first insert part substantially abut the longitudinally tapering sections of the adjacent fastening members.

Preferably, abutting lateral faces of the fastening members and the first insert part are formed substantially complimentary to each other so that they essentially abut each other over the entire extent thereof. In other words when the outer lateral faces of the fastening members are convex, the outer lateral faces of the first insert part are concave.

According to a further embodiment a radially outer face of the first insert part facing towards the outer surface of the root region and an radially inner face of the first insert part facing towards the inner surface of the root region may be substantially planar.

According to an additional embodiment the first insert part may extend at least over the entire longitudinal extent of the adjacent fastening members.

According to another embodiment the insert further may comprise a second insert part being a wedge-shaped tapering extension of the first insert part extending beyond the second end of the adjacent fastening members.

The insert may comprise metal fibres, preferably steel fibres.

Thereby, the rigidity of the insert is improved as compared to an insert comprising only non-metal fibres, such as glass and/or carbon fibres embedded in a polymer matrix. The improved rigidity provides an improved retention of the fastening members and thereby the pull-out strength of the fastening members.

The insert may comprise first layers comprising metal fibres and intermediate second layers comprising a different type of fibres than metal fibres, preferably glass and/or carbon fibres.

Additionally, metal fibres, preferably steel fibres, may be firmly fixed to the fastening members so as to extend therefrom, the metal fibres preferably being fixed to at least the second end of the fastening members.

Metal fibres extending from the fastening members improve the retention of the fastening members in the fibre-reinforced composite material of the root region and thereby the pull-out strength of the fastening members.

The polymer matrix of the fibre-reinforced composite material may be a resin, such as epoxy, polyester or vinylester and as mentioned above the fibres of the fibre-reinforced composite material may be based on glass fibres and/or carbon fibres and/or metal fibres. However, it should be noted that any type of fibres may be used. Further, it should be noted that any type of polymer may be used for the polymer matrix.

Although it is preferred that the elongated fastening members have a circular cross section, it should be noted that they have any cross section, e.g. rectangular or square.

In an advantageous embodiment at least 20, 30, 40, 50, 60, 70, 80, 90 or 100% by volume of the fibres in the fibre-reinforced composite material of the root region are metal fibres, the remaining fibres preferably being glass and/or carbon fibres.

The metal fibres may have a cross-sectional dimension in a range between 0.04 mm and 1.0 mm or in a range between 0.07 and 0.75 mm or in a range 0.1 and 0.5 mm.

The phrase "metal fibres" covers here metal fibres per se, metal filaments and metal wires.

Further, the metal fibres, filaments or wire may be coated with another metal in order to improve the adherence between fibres, filaments or wire and the polymer matrix. As an example, steel fibres may be coated be with zinc or brass.

Advantageously, the fastening members (or the bushing) are bonded into the composite material of the root region. More advantageously, the fastening members are laminated into the composite material of the root region.

BRIEF DESCRIPTION OF THE DRAWINGS

The invention is explained in greater detail below with reference to the drawings, in which.

DETAILED DESCRIPTION OF THE INVENTION

Figure 1:
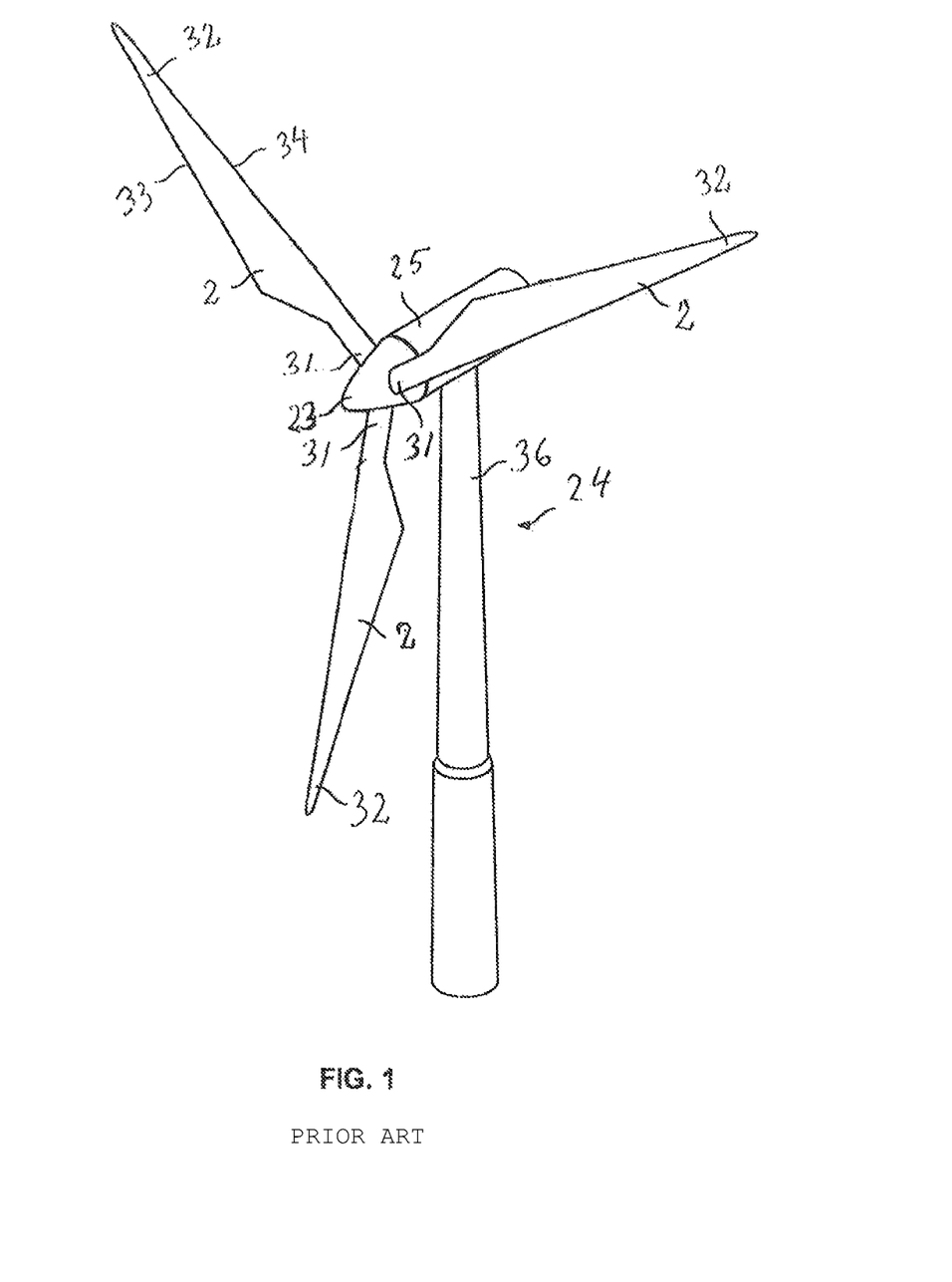
FIG. 1 shows a wind turbine.

FIG. 1 illustrates a conventional, modern upwind turbine 24 according to the so-called "Danish concept" with a tower 36, a nacelle 25 and a rotor with a substantially horizontal rotor shaft. The rotor includes a hub 23 and three blades 2 extending radially from the hub 23, each having a blade root 31 nearest the hub, and a blade tip 32 furthest from the hub 23.

Figure 2:
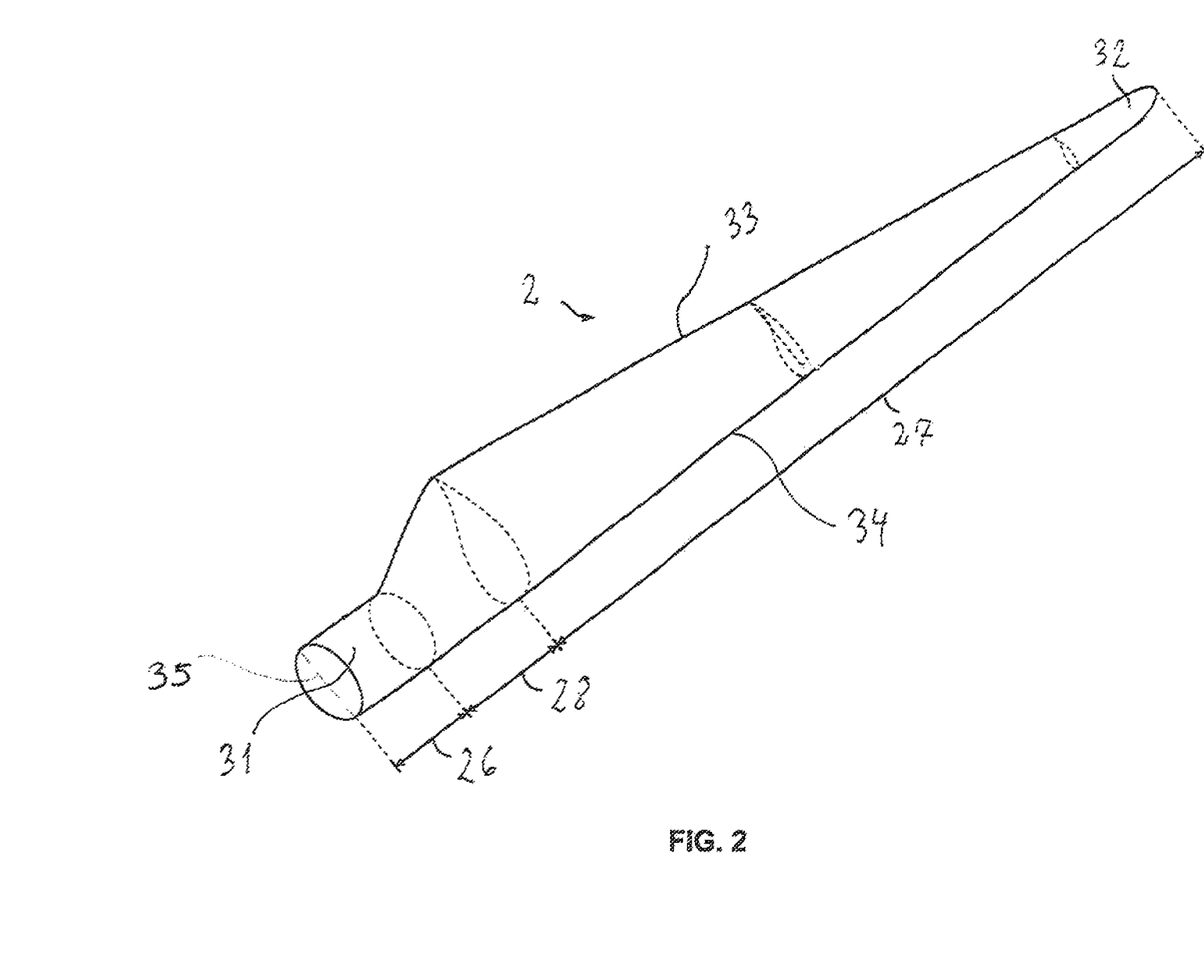
FIG. 2 is a diagrammatic perspective view of a wind turbine blade according to the invention.

As evident seen from FIG. 2, the blade 2 comprises a root region 26 with a root end face 29 closest to the hub, an airfoil region 27 furthest away from the hub, and a transition area 28 between the root region 26 and the airfoil region 27. The airfoil region 27 has an ideal or almost ideal blade shape, whereas the root region 26 has a substantially circular cross section, which reduces storm loads and makes it easier and safer to mount the blade 2 to the hub 23. Preferably, the diameter of the blade root 31 is constant along the entire root region 26. The transition region 28 has a shape gradually changing from the circular shape of the root region 26 to the airfoil profile of an airfoil region 27. The width of the transition region 28 increases substantially linearly with increasing distance from the hub 23.

The blade is often made of two blades halves assembled by being glued or bolted together substantially along a chord plane 35 of the blade. The blade 2 comprises a leading edge 34 facing the rotational direction of the blade 2 when the blade 2 is mounted on the hub 23 and a trailing edge 33 facing in the opposite direction of the leading edge 34. The chord plane 35 extends between the leading edge 34 and the trailing edge 33 of the blade 2. It should be noted that the chord plane does not necessarily run straight over its entire extent, since the blade may be twisted and/or curved, thus providing a chord plane with a correspondingly twisted and/or curved course, this being most often the case in order to compensate for the local velocity of the blade being dependent on the radius from the hub. Due to the circular cross section, the root region 26 does not contribute to the production of the wind turbine and, in fact, it lowers the production slightly due to the wind resistance.

Figure 3:
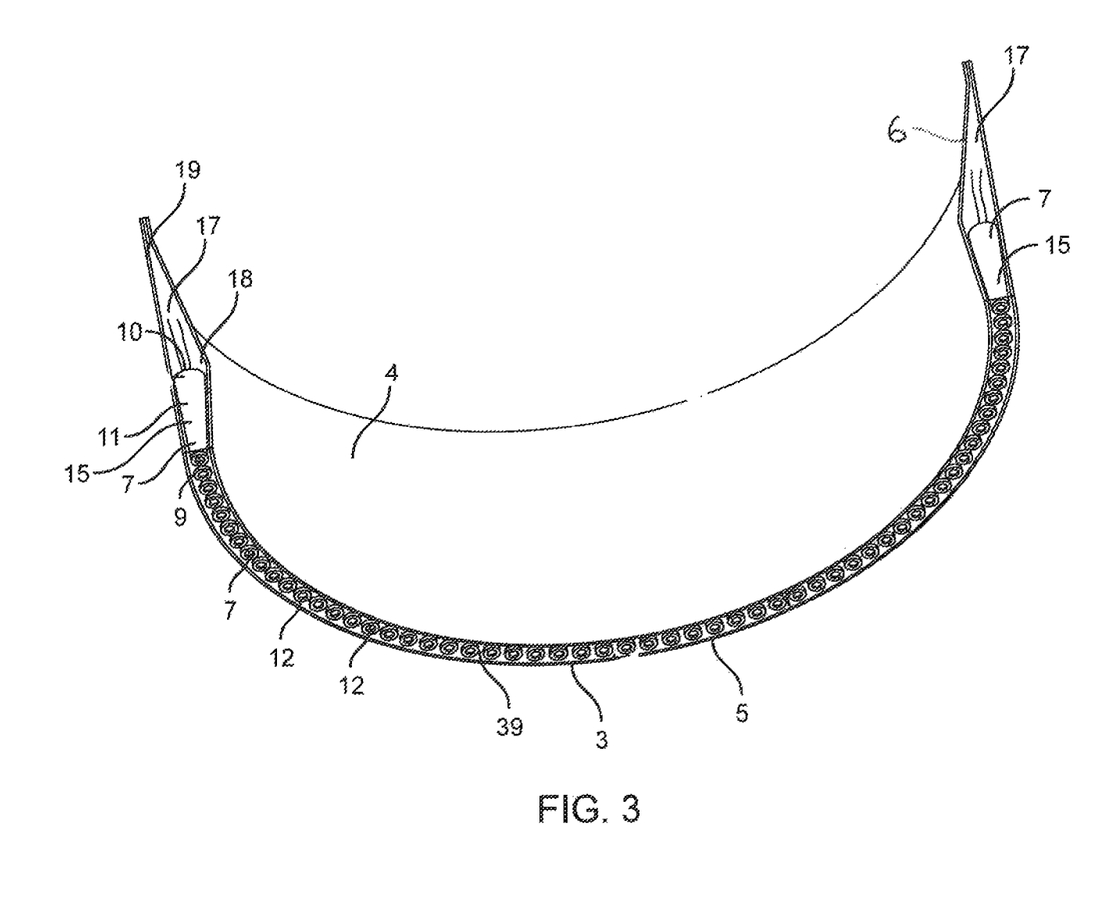
FIG. 3 is a perspective, longitudinal, sectional view of a portion of a root region of a first embodiment of a wind turbine blade according to the invention comprising a first embodiment of fastening members.
Figure 4:
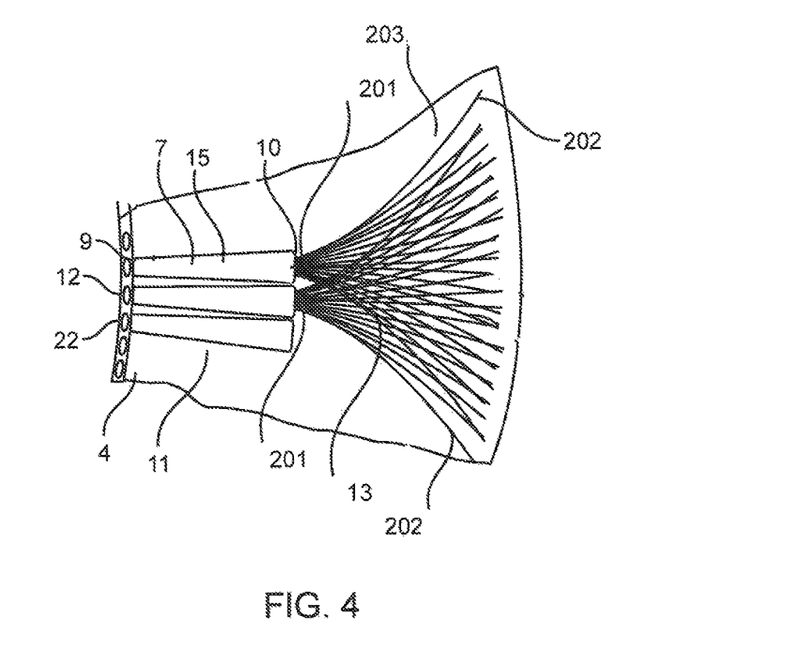
FIG. 4 shows a portion of the root region shown in FIG. 3.

As seen in FIGS. 3 and 4, the blade including the root region 26 is formed as a shell structure. The shell structure of the root region 26 is ring-shaped and comprises an outer surface 3 formed by an outer layer 5 of a fibre-reinforced polymer matrix advantageously of glass fibres and/or carbon fibres and a resin, such as epoxy, polyester or vinylester, and an oppositely arranged inner surface 4 formed by an inner layer 6 being made of the same material as the outer layer 5. Elongated fastening members 7 with fastening means 22 are placed between the layers 5, 6. The fastening members are provided with a longitudinally tapering section 15.

Advantageously, the elongated fastening members 7 are bushings having a circular cross section and comprise a central bore 12 with an inner thread 22 as fastening means. The bushing 7 comprises a first end 9 and an oppositely arranged second end 10. The first end 9 of the bushing 7 is placed at the root end face 29 of the root region. The bushings 7 are arranged mutually spaced apart so as to substantially follow the circumference of the root region and allow access from the outside to the fastening means 22, i.e. the threads used for mounting the blade to the hub. Seen relative to the root region, the outer periphery 11 of the fastening members 7 comprises a radially outer surface 11a, an opposite radially inner surface 11b, a first lateral face 11c, and an opposite lateral face 11d, as shown in FIG. 9.

Intermediate retaining means comprising metal fibres 13 is arranged in each region between adjacent interspaced lateral surfaces 11c, 11d of the fastening members 7, i.e. in the present example the bushings. Further, in the present embodiment the intermediate retaining means are formed of separately manufactured inserts 39. As it appears from FIG. 9, the inserts 39 comprise a first insert part 40 and a second insert part 41. The first insert part 40 essentially corresponds to the region between the lateral faces 11c, 11d of adjacent bushings 7 and is provided with opposite lateral faces 42, 43 formed complimentary to the lateral faces 11c, 11d of the adjacent bushings 7. The inserts 39 substantially extend up next to the adjacent bushings when seen in circumferential direction. Further, the first insert part 40 extends from the first end of the bushings 7 and beyond the second end thereof, as clearly seen in FIG. 9. The second insert part 41 is a wedge-shaped tapering extension of the first insert part 40.

The insert 39 has an inner surface 64 facing towards the inner surface of the root region and an outer surface 65 facing towards the outer surface of the root region. The surfaces 64, 65 are parallel in the first insert part 40, whereas the inner surface 64 tapers towards the outer surface 65 in the second insert part 41.

Figure 9:
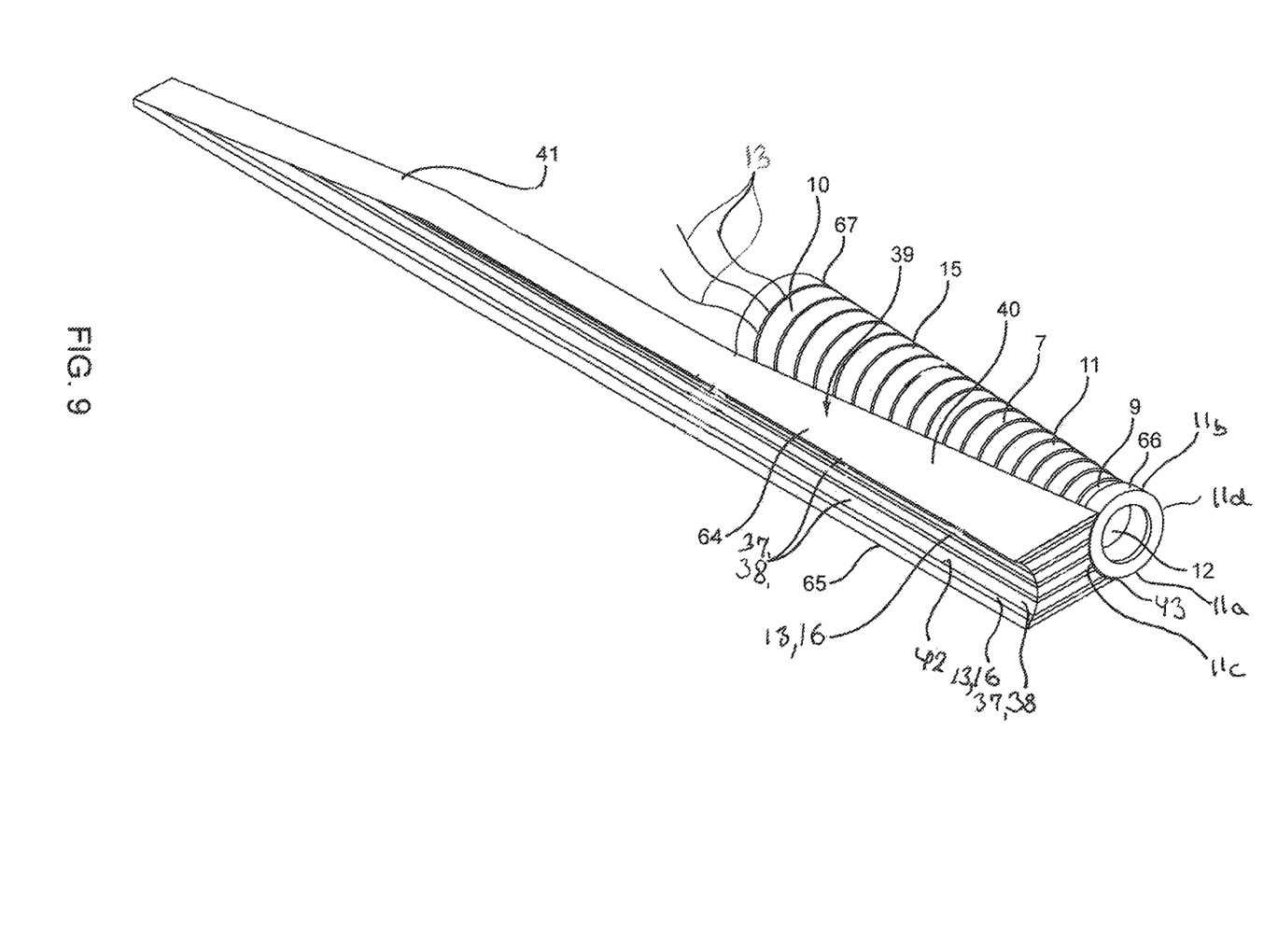
FIG. 9 shows in an enlarged scale a detail of FIG. 3 and discloses a fastening member in form of a bushing arranged next to a separate pre-made insert.

As seen in FIG. 9, the intermediate retaining means formed of the separately manufactured and pre-formed insert 39 comprises a number of first layers 16 comprising metal fibres and intermediate second layers 37 comprising a second fibre material 38 differing from the metal fibres. The first layers 16 comprising metal fibres 13 may be formed of mats comprising metal fibres. The metal fibres are preferably of a material having an E-modulus of at least twice, preferably thrice the E-modulus of glass fibres. A preferred material for the metal fibres is steel. The steel fibres or steel filaments may also be formed into steel wires having a cross-sectional dimension in the range between 0.04 mm and 1.0 mm, or in the range between 0.07 mm and 0.75 mm in the range between 0.1 mm and 0.5 mm. The second layers 37 comprising a different type of fibres than metal fibres preferably comprise glass and/or carbon fibres. The layers 37 may be formed of fibre mats. During manufacture of the inserts 39 the layers comprising the metal fibres and the layers comprising a second type of fibres differing from the metal fibres are embedded in a suitable resin such as polyester, epoxy or vinylester.

As seen inter alia in FIG. 3, metal fibres 13 are firmly fixed to the bushing 7 adjacent the second end 10 thereof. In FIG. 3 the metal fibres 13 are fixed to the end face of the bushing 7, while the metal fibres 13 in FIG. 9 are fixed to the outer surface 11 of the bushing 7 adjacent the second end 9 thereof.

As seen in FIG. 9 the longitudinally tapering section 15 extends the entire extent of the bushing 7 so that the complete outer surface 11 of the bushing 7 tapers from the second end 10 of the bushing 7 to the second end 9 of the bushing 7. Thus, the bushing 7 shown in FIG. 9 has a conical shape and a circular cross section over the entire extent thereof. It should, however, be noted that in other embodiments the longitudinally tapering section 15 may have a shorter extent so as to extend along at least 10%, at least 25%, at least 50% or at least 75% of the longitudinal extent of the bushing 7. With respect to FIG. 9 it should further be noted that in circumferential direction the longitudinally tapering section 15 extends over 360° as seen in circumferential direction. However, it should be noted that the longitudinally tapering section 15 may only extend over a portion of the periphery when seen in circumferential direction.

Further, in the embodiment shown in FIG. 9 the outer periphery or surface 11 of the bushings 7 abuts the adjacent lateral face 43 of the first insert part 40 of the insert 39. Although it is not shown in FIG. 9, an outer surface of an additional bushing abuts the opposite lateral face 43 of the first insert part 40. The lateral faces 42, 43 are formed complimentary to the abutting longitudinally tapering section 15 of the bushing 7. Thus, in the present embodiment the lateral faces 42, 43 of the first insert part 40 have a shape complimentary to the outer conical shape of the bushing 7. As mentioned above, the longitudinally tapering section 15 of the bushing 7 extends over the entire extent of the bushing 7. However, the section 15 may have an extent between a first end 66 and a second end 67 thereof which is smaller than the entire extent of the bushing 7.

The angle of tapering of the longitudinal tapering section 15 may be between 7-45° or 7-30°. Further, it should be noted that the bushing 7 including longitudinally tapering section 15 thereof may be wrapped in glass fibres or in metal fibres, such as metal wool, in order to increase the adherence of the bushings 7 to the fibre-reinforced composite material of the root.

As indicated in FIG. 3, a wedge-shaped element 17 may be arranged behind the bushings 7 as seen in the longitudinal direction of the blade. A first end 18 of the element 17 is arranged in abutment with the second end of the bushing 7, and a second end 19 of the element 17 is tapering. The wedge-shaped elements 17 are made of balsawood or a hard polymer foam or another similar material. In a longitudinal sectional view, the bushing 7 and the abutting wedge-shaped element 17 have a shape corresponding to the shape of the insert 39 so that the wall thickness of the root region decreases gradually in the longitudinal direction of the blade.

As previously mentioned FIGS. 3 and 9 disclose metal fibres 13 firmly fixed to the bushing 7.

However, as more clearly shown in FIG. 4, the bushings 7 are provided with metal fibres 13 having a first fibre end 201 firmly fixed to the second end 10 of the bushing 7, especially the end face of the bushing 7 and an outwardly extending portion 203 ending in an opposite second fibre end 202. As mentioned, the metal fibres 13 may be fixed to the end face of the bushings 7 and/or close thereto at the outer surface 11 of the bushings 7.

As shown in FIG. 4, the fibres 13 extend from the second end 10 of the bushing 7 in a fan-shaped manner so that the distance between the second fibre ends 202 of adjacent fibres exceeds the distance between the first ends 201 of adjacent fibres. The outwardly extending portions 203 of the metal fibres 13 are embedded in the polymer matrix of the fibre-reinforced composite material of the root region. In addition to the metal fibres 13 the fibre-reinforced composite material of the root region comprises additional fibres, which also may be metal fibres and/or fibres other than metal fibres such as carbon and/or glass fibres. Preferably, the metal fibres are steel fibres and may be firmly fixed to the bushings 7 by welding, casting, gluing, soldering or brazing depending on the considered most suitable method and further depending on the material of the fibres and the bushings 7. The metal fibres may, however, also be firmly fixed to the bushings 7 by mechanical means. As an example, the first fibre end of the metal fibres 13 may be firmly clamped between portions of the bushings 7 such as in a compressed opening in the bushing 7.

Figure 5:
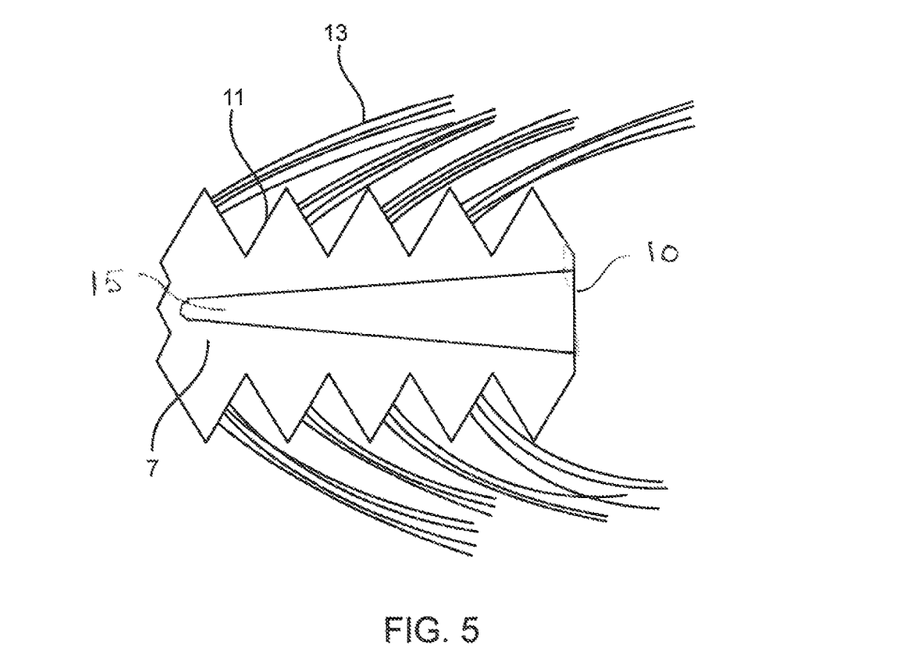
FIG. 5 is a diagrammatic view of a second embodiment of an elongated fastening member, FIG. 6 A shows a third embodiment of an elongated fastening member, FIG. 6 B shows a fourth embodiment of an elongated fastening member.

FIG. 5 shows a portion of a second embodiment of the bushing 7 comprising metal fibres 13 firmly fixed to the outer periphery 11 of the bushing 7. The outer periphery 11 of the bushing 7 is corrugated to increase the surface area thereof. Further, the bushing 7 comprises a longitudinally tapering section 15 tapering in a direction from a second end 10 of the bushing 7 towards a first end (not shown) thereof.

Figure 6A:
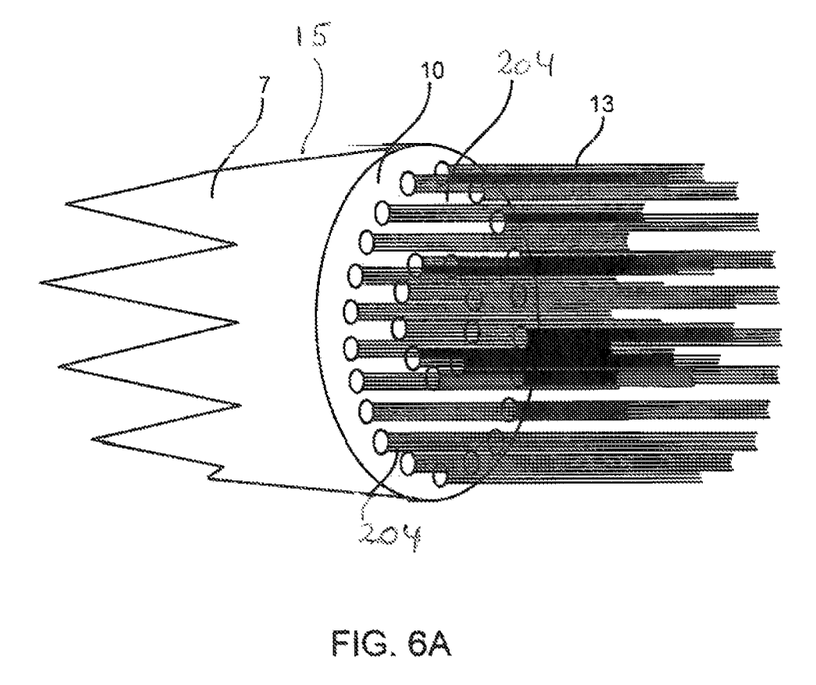

FIG. 6 A shows a third embodiment of a bushing 7 provided with a longitudinally tapering section 15 and outwardly extending metal fibres 13. The metal fibres 13 are arranged in unidirectional fibre bundles 204. Each bundle 204 is firmly fixed to the second end 10 of the bushing 7. The bundle 204 is fixed to the second end 10 in separate circular rows. A first circular row is placed near the periphery of the second end 10 and a second circular row is placed inwardly of the first row. The bushing 7 and the fibre bundles 204 are embedded in the polymer matrix of the fibre-reinforced composite material of the root region. Additional fibres, such as steel fibres or fibres of a different material than metal, are preferably placed in the area between the bundles 204. As shown, the bushing 7 is provided with a longitudinally tapering section 15 tapering from the second end 10 of the bushing 7 towards the first end (not shown) thereof.

Figure 6B:
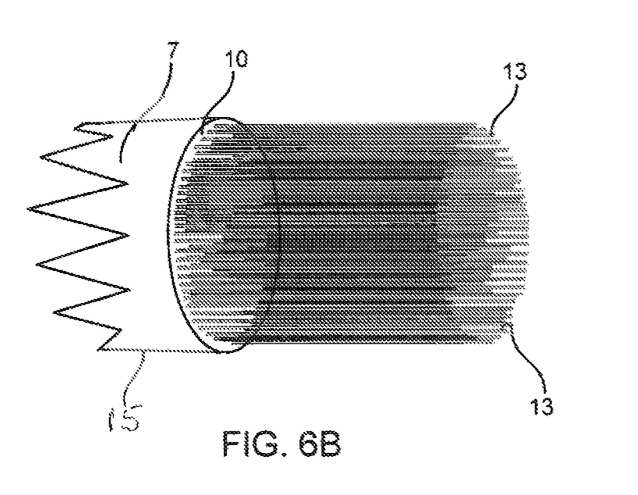

FIG. 6 B shows a fourth embodiment of a bushing 7 comprising a longitudinally tapering section 15 and metal fibres 13. The metal fibres 13 are arranged unidirectionally and each of the fibres is separately firmly fixed to the bushing 7. The bushing 7 is provided with a longitudinally tapering section 15 tapering from tapering from the second end 10 of the bushing 7 towards the first end (not shown) thereof.

Figure 7:
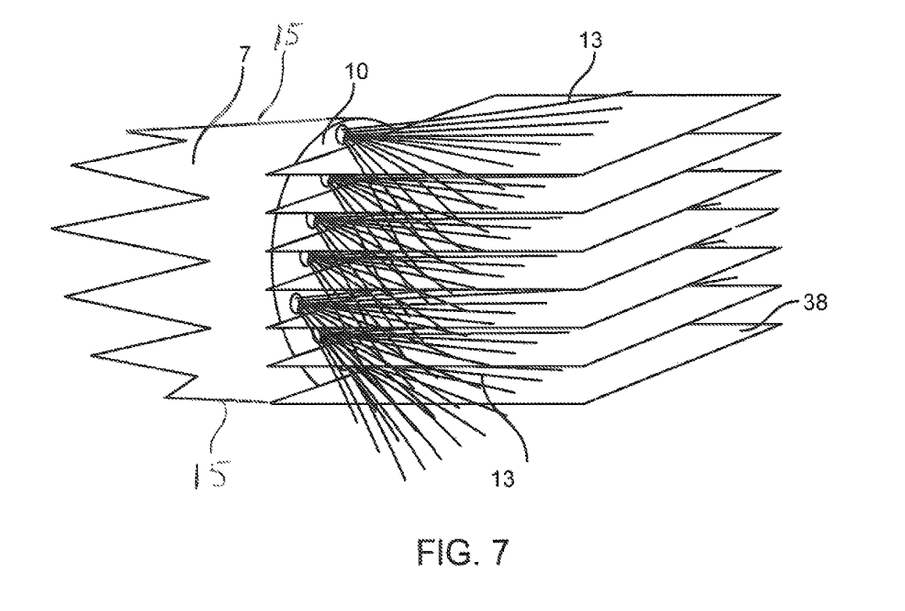
FIG. 7 shows a fifth embodiment of an elongated fastening member.

FIG. 7 shows a fifth embodiment of a bushing 7 comprising a longitudinally tapering section 15 and metal fibres 13. The metal fibres 13 are firmly fixed to the second end 10 in bundles 204 and are arranged multi-directionally. As shown, layers of a second fibre material 38 different from metal fibres are arranged between the fibre bundles 204 extending from the second end 10 of the bushing 7 so as to substantially form a fan. However, as shown, some of the metal fibres 13 may cross and pass through the layers of the second fibre material 38 different from metal fibres. As mentioned above, the bushings 7, the metal fibres 13 and the second fibre material 38 are embedded in the polymer matrix of the fibre-reinforced composite material of the root region. Preferably, the layers of the second fibre material 38 are made of glass and/or carbon fibres.

The bushing 7 is provided with a longitudinally tapering section 15 tapering from the second end 10 of the bushing 7 towards the first end (not shown) thereof.

Figure 8:
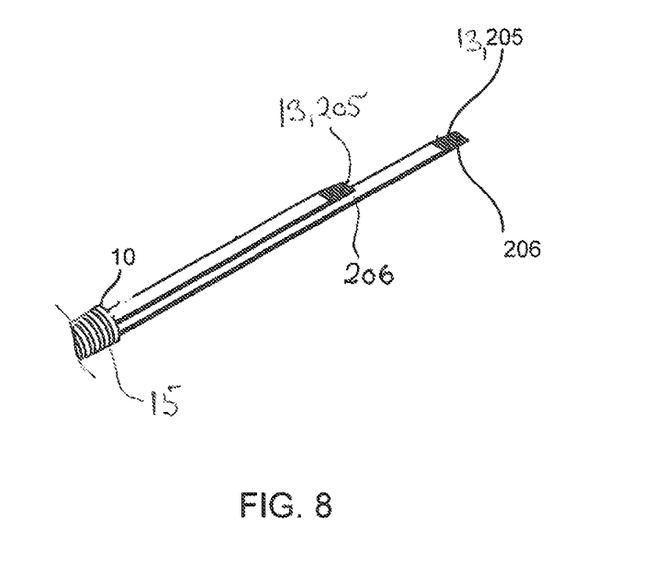
FIG. 8 shows a sixth embodiment of an elongated fastening member.

FIG. 8 shows a sixth embodiment of an elongated bushing 7 provided with metal fibres 13. The metal fibres 13 are arranged in separate layers 205 of metal fibres 13, said layers being in form of fibre bundles, fibre mats or fibre strips. A first end of the fibres bundles, mats or strips is firmly fixed to the second end 10 of the bushing 7. Between layers 205 of metal fibres 13, a layer 206 of a second fibre material different from metal is arranged. The layers 205 of metal fibres and the layer 206 of a second fibre material are embedded in the polymer matrix of the fibre-reinforced composite material of the root region.

The bushing 7 is provided with a circumferential corrugated outer surface provided with a longitudinally tapering section 15 tapering from the second end 10 of the bushing 7 towards the first end (not shown) thereof.

The metal fibres, filaments or wire may have a cross-sectional dimension in the range between 0.04 mm and 1.0 mm, or in the range between 0.07 mm and 0.75 mm, or in the range between 0.1 mm and 0.5 mm. In some of the embodiments of the longitudinal fastening members, such as the bushing 7, the metal fibres may be formed into fibre mats, strips or bundles which may be unidirectional mats, strips or bundles, multidirectional mats, strips or bundles, woven mats or strips, or mats or strips comprising chopped fibres. Additionally, the metal fibres, filaments or wires may be incorporated into mats, strips or bundles comprising a different type of fibres than metal fibres, such as carbon fibres and/or glass fibres, i.e. the metal fibres may be incorporated into so-called hybrid mats, strips or bundles.

The percentage by volume of metal fibres in the mats, strips or bundles may be 20, 30, 40, 50, 60, 70, 80 90 or 100, the remaining fibres being a different type of fibres, preferably glass and/or carbon fibres. Correspondingly, the percentage by volume of metal fibres in the root region, where metal fibres are provided, may be 20, 30, 40, 50, 60, 70, 80 90 or 100, the remaining fibres being a different type of fibres, preferably glass and/or carbon fibres.

Figure 10A:
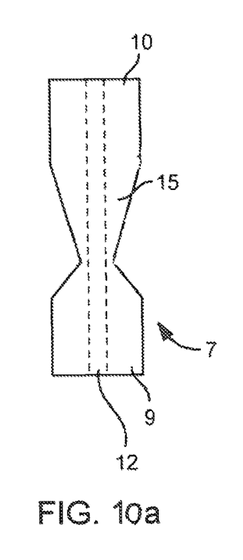
FIGS. 10a-c show three different embodiments an elongated fastening member comprising a longitudinally tapering section.
Figure 10B:
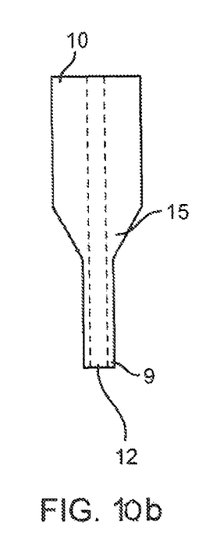
Figure 10C:
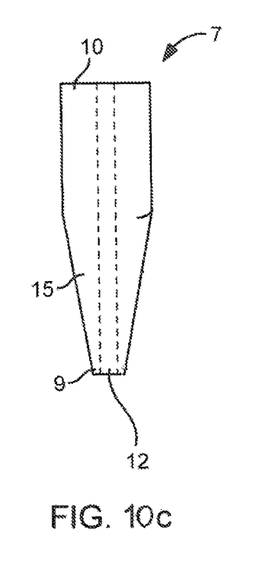

FIGS. 10a-c show additional different embodiments of elongated bushings 7 comprising a longitudinally tapering section 15.

In FIG. 10a, the longitudinally tapering section 15 is placed at the central part of the bushing 7 when seen in the longitudinal direction thereof and extends over about 50% of the longitudinal extent of the bushing 7. The cross section of the bushing 7 and/or the longitudinally tapering section 15 may have any of the cross sections shown in FIGS. 10d-g or any other cross section. The longitudinally tapering section 15 tapers in the direction from the second end 10 of the bushing 7 towards the first end 9 of the bushing 7. The longitudinally tapering section 15 need not be tapered over the entire circumference thereof. Further and as mentioned above, the longitudinally tapering section 15 need not extend over the entire extent of the bushing 7.

In FIG. 10b the longitudinally tapering section 15 extends over about 10-15% of the longitudinal extent of the bushing 7. The longitudinally tapering section 15 is arranged in the central part of the bushing 7 and between a first portion of the bushing 7 adjacent the second end 10 thereof and a second portion of the bushing 7 at the first end thereof and having a smaller cross-sectional dimension than the first portion.

In FIG. 10c the longitudinally tapering section 15 extends over about 50% of the longitudinal extent of the bushing 7 and is arranged at the first end 9 of the bushing 7. The longitudinally tapering section 15 tapers in the direction from the second end 10 of the bushing 7 towards the first end 9 of the bushing 7.

The cross sections shown in FIGS. 10d-g are different possible cross sections of the longitudinally tapering section 15 of the bushing 7.

Figure 10D:
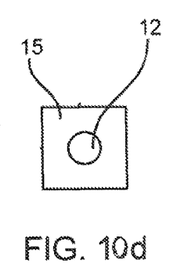
FIGS. 10d-g show four different cross sections of different longitudinally tapering sections.

In FIG. 10d the longitudinally tapering section 15 has an essentially square cross section over the entire longitudinal extent thereof.

Figure 10E:
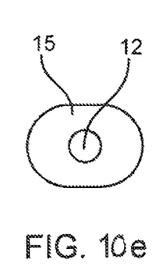

In FIG. 10e the longitudinally tapering section 15 has an oblong cross section over the entire extent thereof, opposite lateral portions of the section 15 having an essentially circular shape so as to abut complimentarily formed lateral faces of adjacent inserts 39. The tapering section 15 has further opposite planar surfaces.

Figure 10F:
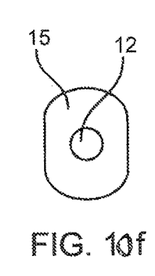

In FIG. 10f the longitudinally tapering section 15 also has an essentially oblong cross section comprising opposite essentially circular faces and opposite planar faces. In this embodiment the opposite planar faces are adapted to abut planar lateral faces of adjacent inserts.

Figure 10G:
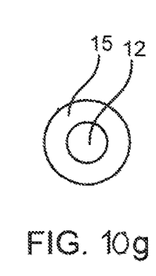

In FIG. 10g the longitudinally tapering section 15 has a conical shape over the entire extent thereof.

Although the longitudinally tapering section 15 has been shown as continuously tapering, it should be noted that the longitudinally tapering section 15 also may taper stepwise in the direction from the second end towards the first end of the elongated fastening members shown as bushings 7 in the disclosed embodiments.

LIST OF REFERENCE NUMERALS

2 Wind turbine blade
3 Outer surface of root
4 Inner surface of root
5 Outer layer
6 Inner layer
7 Elongated fastening member (bushing)
9 First end of fastening member
10 Second end of fastening member
11 Outer periphery of fastening member
11a Radially outer surface
11b Radially inner surface
11c First lateral face
11d Second lateral face
12 Central bore
13 Metal fibres
15 Longitudinally tapering section
16 First layer comprising metal fibres
17 Wedge-shaped element
18 First end of element
19 Second end of element
22 Fastening means (inner threads)
23 Hub
24 Wind turbine
25 Nacelle
26 Root region
27 Airfoil region
28 Transition region
29 Root end face
31 Blade root
32 Blade tip
33 Trailing edge
34 Leading edge
35 Chord plane
36 Tower
37 Second layers
38 Second fibre material
39 Insert
40 First insert part
41 Second insert part
42 Lateral face of insert
43 Lateral face of insert
64 Inner surface of insert 65 Outer surface of insert
66 First end of section 15
67 Second end of section 15
201 First fibre end
202 Second fibre end
203 Outwardly extending portion of metal fibres
204 Metal fibre bundle
205 Separate layer of metal fibres
206 Layer of a second fibre material

The invention claimed is:

1. A wind turbine blade for a wind turbine rotor comprising a hub from which the wind turbine blade extends when mounted to the hub, the wind turbine blade including a shell structure of a fibre-reinforced composite material comprising fibres embedded in a polymer matrix, the wind turbine blade extending in longitudinal direction and having a profiled contour including a pressure side and a suction side as well as a leading edge and a trailing edge, the edges defining a chord plane therebetween, when seen in the longitudinal direction the profiled contour comprising a root region with a root end face, an airfoil region and a transition region between the root region and the airfoil region,
the root region having a ring-shaped cross section with an outer surface and an inner surface,
the root region comprising a plurality of elongated fastening members provided with fastening means, the elongated fastening members are embedded mutually spaced apart in the fibre-reinforced polymer matrix so as to substantially follow a circumference of the root region and allow access from outside to the fastening means used for mounting the blade to the hub,
the elongated fastening members comprising a first end arranged at the root end face, a second end opposite the first end, and an outer periphery comprising an outer surface, an inner surface, a first lateral face and an opposite second lateral face,
characterised in that at least a number of the plurality of elongated fastening members are formed with a longitudinally tapering section where the outer periphery is tapering in a direction from the second end towards the first end of the elongated fastening members over at least 10% of the longitudinal extent of the elongated fastening members;
wherein any cross section of the elongated fastening members is circular, perpendicular to a longitudinal axis thereof;
wherein the elongated fastening members are bushings and the fastening means is a thread in a bore in the bushing;
wherein the root region further comprises an insert separately formed of a fibre-reinforced polymer matrix and entirely arranged in regions between adjacent lateral faces of adjacent elongated fastening members, the inserts comprising a first insert part substantially corresponding to the region between the lateral faces of the adjacent elongated fastening members; and
wherein the first insert part extends at least over the entire longitudinal extent of the adjacent elongated fastening members.

2. The wind turbine blade according to claim 1, wherein adjacent elongated fastening members are arranged so that longitudinally tapering sections of adjacent elongated fastening members face each other.

3. The wind turbine blade according to claim 1, wherein the longitudinally tapering section of each elongated fastening member extends over the entire circumference of each elongated fastening member within the longitudinal extent of the longitudinally tapering section.

4. The wind turbine blade according to claim 1, wherein the longitudinally tapering section extends over at least 20% of the longitudinal extent of each elongated fastening member.

5. The wind turbine blade according to claim 1, wherein the outer periphery of the longitudinally tapering section is substantially smooth.

6. The wind turbine blade according to claim 1, wherein the longitudinally tapering section of the at least a number of the plurality of elongated fastening members comprises oppositely arranged planar surfaces converging against each other.

7. The wind turbine blade to claim 1, wherein the opposite lateral faces of the first insert part substantially abut the longitudinally tapering sections of the adjacent elongated fastening members.

8. The wind turbine blade to claim 1, wherein a radially outer face of the first insert part facing towards the outer surface of the root region and a radially inner face of the first insert part facing towards the inner surface of the root region are substantially planar.

9. The wind turbine blade according to claim 1, wherein the insert comprises metal fibres.

10. The wind turbine blade according to claim 1, wherein metal fibres are firmly fixed to the elongated fastening members so as to extend therefrom.

11. The wind turbine blade according to claim 1, wherein the elongated fastening members are laminated into the composite material of the root region.

12. The wind turbine blade according to claim 4, wherein the longitudinally tapering section extends over at least 30% of the longitudinal extent of each elongated fastening member.

13. The wind turbine blade according to claim 12, wherein the longitudinally tapering section extends over at least 40% of the longitudinal extent of each elongated fastening member.

14. The wind turbine blade according to claim 13, wherein the longitudinally tapering section extends over at least 50% of the longitudinal extent of each elongated fastening member.

15. The wind turbine blade according to claim 14, wherein the longitudinally tapering section extends over at least 60% of the longitudinal extent of each elongated fastening member.

16. The wind turbine blade according to claim 15, wherein the longitudinally tapering section extends over at least 70% of the longitudinal extent of each elongated fastening member.

17. The wind turbine blade according to claim 16, wherein the longitudinally tapering section extends over at least 80% of the longitudinal extent of each elongated fastening member.

18. The wind turbine blade according to claim 17, wherein the longitudinally tapering section extends over at least 90% of the longitudinal extent of each elongated fastening member.

19. The wind turbine blade according to claim 18, wherein the longitudinally tapering section extends over 100% of the longitudinal extent of each elongated fastening member.

20. The wind turbine blade according to claim 9, wherein the metal fibres comprise steel fibres.

21. The wind turbine blade according to claim 10, wherein metal fibres comprise steel fibres.

22. The wind turbine blade according to claim 10, wherein the metal fibres are fixed at least to the second end of the elongated fastening members.

23. A wind turbine blade for a wind turbine rotor comprising a hub from which the wind turbine blade extends when mounted to the hub, the wind turbine blade including a shell structure of a fibre-reinforced composite material comprising fibres embedded in a polymer matrix, the wind turbine blade extending in longitudinal direction and having a profiled contour including a pressure side and a suction side as well as a leading edge and a trailing edge, the edges defining a chord plane therebetween, when seen in the longitudinal direction the profiled contour comprising a root region with a root end face, an airfoil region and a transition region between the root region and the airfoil region, the root region having a ring-shaped cross section with an outer surface and an inner surface, the root region comprising a plurality of elongated fastening members provided with fastening means, the elongated fastening members are embedded mutually spaced apart in the fibre-reinforced polymer matrix so as to substantially follow a circumference of the root region and allow access from outside to the fastening means used for mounting the blade to the hub, the elongated fastening members comprising a first end arranged at the root end face, a second end opposite the first end, and an outer periphery comprising an outer surface, an inner surface, a first lateral face and an opposite second lateral face, characterised in that at least a number of the plurality of elongated fastening members are formed with a longitudinally tapering section where the outer periphery is tapering in a direction from the second end towards the first end of the elongated fastening members over at least 10% of the longitudinal extent of the elongated fastening members;

wherein any cross section of the elongated fastening members is circular, perpendicular to a longitudinal axis thereof;

wherein the elongated fastening members are bushings and the fastening means is a thread in a bore in the bushing;

wherein the root region further comprises an insert separately formed of a fibre-reinforced polymer matrix and entirely arranged in regions between adjacent lateral faces of adjacent elongated fastening members, the inserts comprising a first insert part substantially corresponding to the region between the lateral faces of the adjacent elongated fastening members; and wherein the insert further comprises a second insert part being a wedge-shaped tapering extension of the first insert part extending beyond the second end of the adjacent elongated fastening members.

* * * * *